US009208911B2

(12) United States Patent
Frepoli et al.

(10) Patent No.: US 9,208,911 B2
(45) Date of Patent: Dec. 8, 2015

(54) FULL SPECTRUM LOCA EVALUATION MODEL AND ANALYSIS METHODOLOGY

(75) Inventors: Cesare Frepoli, Murrysville, PA (US); Katsuhiro Ohkawa, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1047 days.

(21) Appl. No.: 13/303,188

(22) Filed: Nov. 23, 2011

(65) Prior Publication Data

US 2012/0185222 A1    Jul. 19, 2012

Related U.S. Application Data

(60) Provisional application No. 61/416,371, filed on Nov. 23, 2010.

(51) Int. Cl.
| | | |
|---|---|---|
| *G06F 17/10* | (2006.01) | |
| *G06F 17/50* | (2006.01) | |
| *G21G 1/06* | (2006.01) | |
| *G21C 17/00* | (2006.01) | |
| *G06G 7/48* | (2006.01) | |
| *G21D 3/00* | (2006.01) | |
| *G21D 3/04* | (2006.01) | |

(52) U.S. Cl.
CPC ............ *G21D 3/001* (2013.01); *G21D 3/04* (2013.01); *Y02E 30/40* (2013.01)

(58) Field of Classification Search
CPC .......... G21D 3/001; G21D 3/04; Y02E 30/39; Y02E 30/40

USPC .................. 703/1, 2, 6; 376/179, 245, 261
See application file for complete search history.

(56) References Cited

U.S. PATENT DOCUMENTS 5,009,833 A    4/1991    Takeuchi et al.
(Continued)

OTHER PUBLICATIONS

Hedayat (Loss of coolant accident analysis on Tehran research reactor by RELAP5/MOD3.2 code, 2007, 18 pages).*
(Continued)

*Primary Examiner* — Kamini S Shah
*Assistant Examiner* — Andre Pierre Louis
(74) *Attorney, Agent, or Firm* — Richard J. Coldren; Westinghouse Electric Company LLC

(57) ABSTRACT

This invention relates to a computational system and method for performing a safety analysis of a postulated Loss of Coolant Accident in a nuclear reactor for a full spectrum of break sizes including various small, intermediate and large breaks. Further, modeling and analyzing the postulated small break, intermediate break and large break LOCAs are performed with a single computer code and a single input model properly validated against relevant experimental data. Input and physical model uncertainties are combined following a random sampling process, e.g., a direct Monte Carlo approach (ASTRUM-FS) and advanced statistical procedures are utilized to show compliance with Nuclear Regulatory Commission 10 CFR 50.46 criteria.

9 Claims, 6 Drawing Sheets

(56) References Cited

U.S. PATENT DOCUMENTS

| | | | |
|---|---|---|---|
| 8,126,106 B2* | 2/2012 | Hyde et al. | 376/261 |
| 2004/0086071 A1* | 5/2004 | Lee et al. | 376/259 |
| 2005/0089831 A1 | 4/2005 | Russell, II et al. | |
| 2006/0149515 A1 | 7/2006 | Horton et al. | |
| 2006/0285629 A1* | 12/2006 | Stabel et al. | 376/438 |
| 2007/0213959 A1 | 9/2007 | Kropaczek et al. | |
| 2008/0154838 A1 | 6/2008 | Watford et al. | |
| 2008/0288121 A1 | 11/2008 | Fedosovskiy et al. | |
| 2011/0069801 A1* | 3/2011 | McWhirter et al. | 376/245 |

OTHER PUBLICATIONS

Bucalossi (Current use of best estimate plus uncertainty methods on operational procedures addressing normal and emergency conditions, 2008, (93 pages)).*

Rathmann (Computer codes for small-break loss of coolant accident, 1985 (131 pages)).*

International Preliminary Report on Patentability for PCT/US2011/061987 dated Aug. 6, 2013 (Form PCT/IB/373, PCT/ISA/237).

Written Opinion of the International Searching Authority for PCT/US2011/061987 dated Mar. 21, 2012 (Form PCT/ISA/237).

* cited by examiner

FULL SPECTRUM LOCA EVALUATION MODEL AND ANALYSIS METHODOLOGY

CROSS-REFERENCE TO RELATED APPLICATIONS

This patent application claims priority to U.S. Provisional Patent Application No. 61/416,371 which was filed on Nov. 23, 2010.

BACKGROUND OF THE INVENTION

1. Field of the Invention

This invention relates generally to light water nuclear reactors and more particularly, to automated computational systems and methods for performing safety analyses in pressurized water reactors (PWRs) in conformance with 10 CFR 50.46, such as, postulated Loss of Coolant (LOCA) accidents.

2. Background of the Invention

In general, safety analysis data is used in assessing and managing various issues relating to the operation of light water nuclear reactors at commercial nuclear plants. Various systems and methods are known in the art to perform safety analyses in PWRs in conformance with 10 CFR 50.46. For example, there are known systems and methods for analyzing postulated Large Break and Small Break Loss of Coolant (LOCA) accidents.

In compliance with 10 CFR 50.46, postulated large break and small break LOCA accidents are analyzed to show that the Emergency Core Cooling System (ECCS) of PWRs satisfy the general design acceptance criteria. In the nuclear industry, particularly, in the United States, these types of safety analyses are performed using different evaluation models. For example, a conservative, deterministic approach is used to analyze Small Break LOCA and a Best-Estimate Plus Uncertainty (BEPU) method is used to analyze Large Break LOCAs. It is typical not to analyze intermediate breaks because they are considered not to be limiting based on simplistic engineering arguments of analysis.

It is desired in the art to develop automated computational systems and methods which are capable to perform safety analyses in PWRs of LOCAs for a full spectrum of break types and sizes including small breaks, intermediate breaks and large breaks.

SUMMARY OF THE INVENTION

These needs and others are satisfied by the present invention, which is directed to a computation system and method for performing a safety analysis of a Loss of Coolant Accident in a nuclear reactor.

In one aspect, the present invention provides a computational system for performing a safety analysis of a postulated Loss of Coolant Accident in a nuclear reactor. The computational system includes an input model which includes noding for a full spectrum of break sizes of the postulated Loss of Coolant Accident, the input model includes an input deck which identifies parameters of the nuclear reactor selected from the group consisting of reactor geometry, initial conditions and boundary conditions, the parameters include constant values and uncertainty values; an uncertainty database including a set of uncertainty values for specific parameters identifying phenomena expected to occur during the postulated Loss of Coolant Accident; an input processor to extract uncertainty values from the uncertainty data base, generate an input deck for each of the uncertainty values and execute a Loss of Coolant Accident simulation for each of the uncertainty values, the uncertainty values encompassing a spectrum of break sizes for the postulated Loss of Coolant Accident ranging from small break to large break; and a code to compute a response of the nuclear reactor to the Loss of Coolant Accident simulation for each of the uncertainty values.

In another aspect, the present invention provides a computational method for safety analysis of a postulated Loss of Coolant Accident in a nuclear reactor. The computational method includes developing an evaluation model; creating an input template comprising plant-specific data of the nuclear reactor including constant values and variables, one of the variables being break size of the postulated Loss of Coolant accident; entering the input template into the evaluation model; employing a random sampling procedure to assign numerical values to the variables, the variables encompassing a spectrum of break sizes for the postulated Loss of Coolant Accident ranging from small break to large break; transforming the input template into N input models, wherein N represents a number of variations; executing the N input models in parallel; obtaining results for each of the N input models; post-processing the results; and obtaining statistical merits to demonstrate compliance with design acceptance criteria.

In still another aspect, the present invention provides a computational method for safety analysis of a postulated Loss of Coolant Accident in a nuclear reactor. The computational method includes developing an evaluation model; creating an input template to load into the evaluation model, the input template comprising plant-specific data of the nuclear reactor including constant values and uncertainty values, one of the uncertainty values being break size of the postulated Loss of Coolant Accident; employing a random sampling approach to generate model parameters and assign numerical values to the uncertainty values, the uncertainty values encompassing a spectrum of break sizes for the postulated Loss of Coolant Accident ranging from small break to large break; generating variations of the input template to represent different values for the uncertainty values; executing a plurality of transient simulations to encompass a spectrum of break sizes for the postulate d Loss of Coolant Accident; computing a response of the nuclear reactor for the spectrum of break sizes for the postulated Loss of Coolant Accident; and post-processing the results to obtain statistical figure of merits to demonstrate compliance with design acceptance criteria.

BRIEF DESCRIPTION OF THE DRAWINGS

A full understanding of the invention can be gained from the following description of the preferred embodiments when read in conjunction with the accompanying drawings in which.

Each of FIG. 3

DETAILED DESCRIPTION OF THE INVENTION

Figure 1:
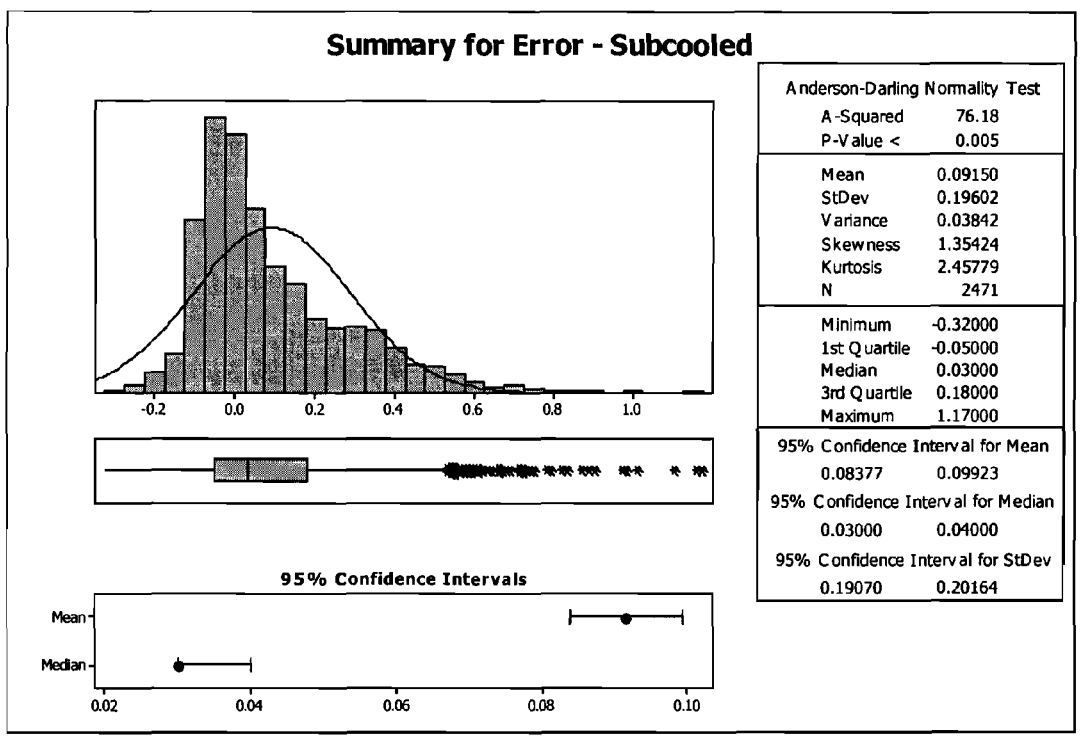
FIG. 1 and FIG. 2 each is a histogram for uncertainty in a single-phase sub-cooled period (CD1) and a two-phase saturated and single-phase vapor period (CD2), in accordance with an embodiment of the present invention.

The computational systems and methods of the present invention include a software tool designed to model and analyze postulated loss of coolant accidents (LOCAs) in compliance with 10 CFR 50.46.

The present invention allows the application of a Best-Estimate Plus Uncertainty approach to an entire spectrum of break sizes including various small, intermediate and large breaks for postulated LOCAs in a PWR. Further, modeling and analyzing postulated small break, intermediate break and large break LOCAs with a single computer code and a single input model properly validated against relevant experimental data is provided. Input and physical model uncertainties are combined following a random sampling procedure, e.g., a direct Monte Carlo approach (ASTRUM-FS) and advanced statistical procedures are utilized to show compliance with 10 CFR 50.46 criteria.

A postulated LOCA scenario is initiated by an instantaneous rupture of a reactor coolant system (RCS) pipe. The break type considered is either (i) a double-ended guillotine defined as complete severance of the pipe resulting in unimpeded flow from either end or (ii) a split break defined as a partial tear. The break size considered in this invention includes any break size such that break flow is beyond the capacity of the normal charging pumps up to and including a double ended guillotine rupture with a break flow area two times the pipe area. Thus, the computational systems and methods described are capable to model and analyze a spectrum of break sizes, such as intermediate break sizes, which are typically not analyzed in known evaluation models.

Plant-specific data, such as the geometry of the reactor model, the power history, and the materials properties, are used as inputs to solve various calculations. These inputs are unique to a particular nuclear reactor being analyzed. This invention is applicable to light water nuclear reactors, such as, pressurized water reactors ("PWRs") and boiling water reactors ("BWRs"), and is fully customizable to various light water nuclear reactor designs and not limited based on a particular nuclear reactor design.

A full-spectrum LOCA evaluation model (FSLOCA EM) has been developed in accordance with and adherence to Nuclear Regulatory Guide 1.203, Evaluation Model Development and Assessment Process. In general, regulatory guides describe processes which the Nuclear Regulatory Commission (NRC) consider acceptable for use in developing and assessing evaluation models that may be used to analyze transient and accident behavior that is within the design basis of a nuclear power plant. The process for developing an evaluation model typically is initiated by identifying the functional requirements of the evaluation model that satisfy its intended purpose. To provide the appropriate focus and balance to the development process, a Phenomena Identification and Ranking Table (PIRT) may be employed. The PIRT identifies and classifies important phenomena to be simulated in the evaluation model. Use of the PIRT is based on expert opinion and engineering judgment about the scenario that needs is being modeled.

The evaluation model is incorporated into a computational system or code and the code is validated against Separate Effect Tests (SETs) and Integral Effect Tests (IETs) which simulate relevant LOCA phenomena. The purposes of assessing the code against SET and IET include: 1) to confirm the adequacy of the evaluation model capabilities in modeling the scenario for which it is designed and 2) to assess bias and uncertainties of key model parameters to allow quantification of total uncertainty for performing a best-estimate plus uncertainty analysis. The second purpose is accomplished by characterizing the bias and uncertainty associated with parameters controlling the important phenomena and obtaining the probability density functions (PDFs) associated with such parameters. However, for some evaluation models, a conservative bias may be used to reduce licensing risks.

PDFs or cumulative distribution functions (CDFs) are generated by comparing code predictions of SET against the data. In one embodiment, a procedure is utilized to determine bias and uncertainty (and CDF) for a critical flow model. The assessment of the break flow model includes a large number of data points from various geometries which are used to determine bias and uncertainty associated with the critical flow model prediction used in the code. The ratio between the measured value and the predicted value is obtained. This ratio is referred to as the discharge coefficient (CD). The CD is the correction (or multiplier) that is applied to the code results to correct for the bias observed in a specific data point relative to the measured value. The application of the discharge coefficient is accomplished by modifying the break flow area.

Two uncertainty parameters are considered in the code: i) the uncertainty during the single-phase sub-cooled period, i.e., CD1 and ii) the uncertainty during the two-phase saturated and single-phase vapor period, i.e., CD2. The break type and break area are selected, and the uncertainty on the break flow model is treated by independently sampling a value for CD1 and CD2 from their respective distributions (PDFs). In one embodiment, the distributions for CD1 and CD2 are characterized by the following bias and standard deviation.

| | Bias | Standard Deviation |
|---|---|---|
| CD1 (−0.043 ≤ Quality ≤ 0) | 9.2% | 19.6% |
| CD2 (0 < Quality ≤ 1.0) | 26.8% | 31.1%. |

Figure 2:
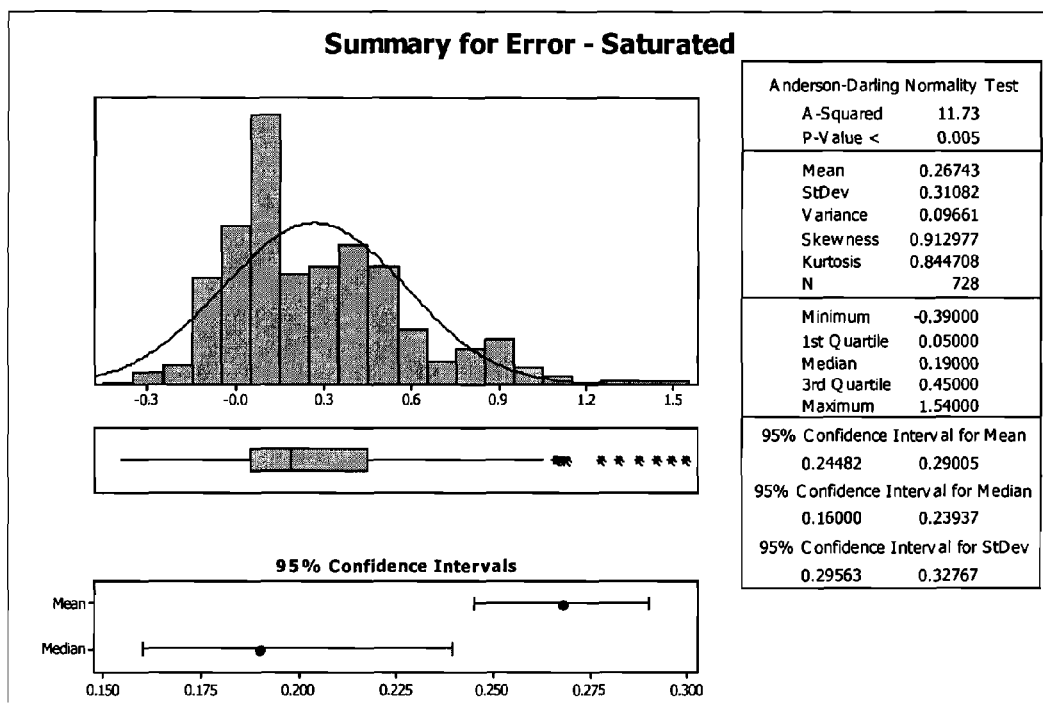
Figure 3:
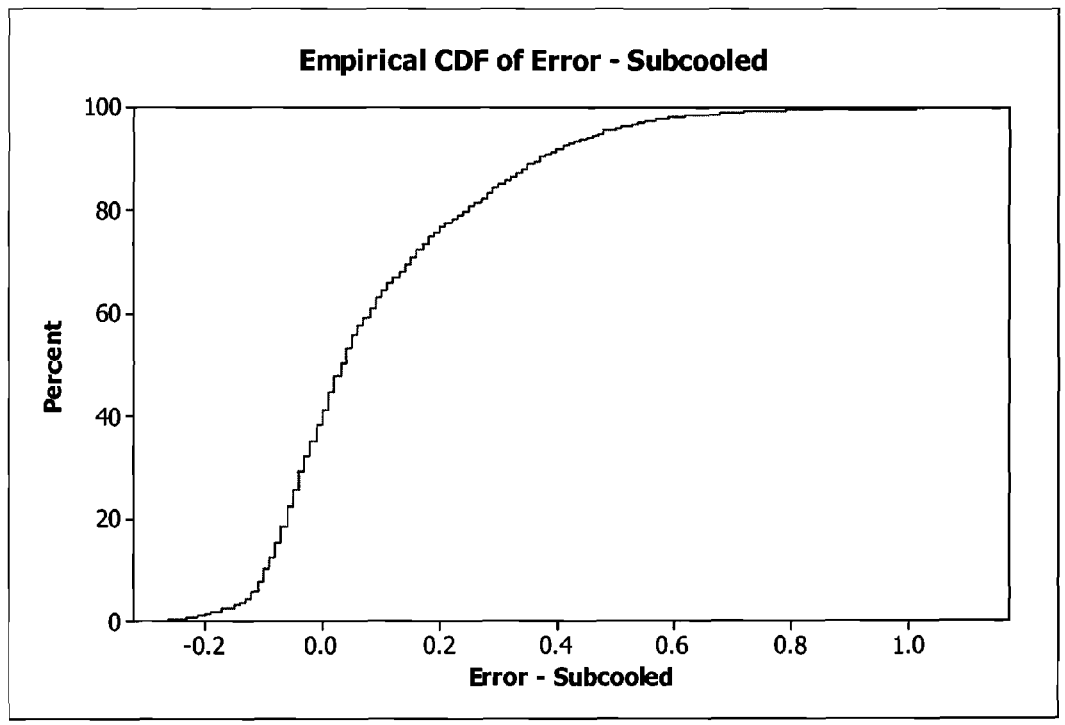
Figure 4:
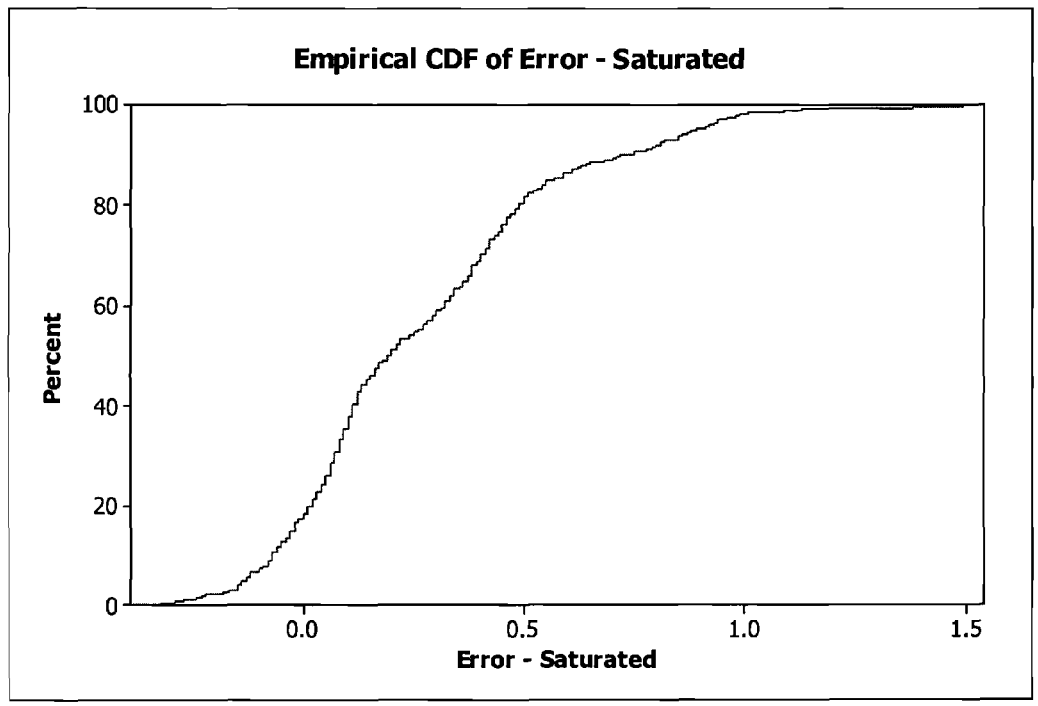
FIG. 4 shows a Cumulative Distribution Function (CDF) which corresponds to FIG. 1 and FIG. 2, respectively, in accordance with an embodiment of the present invention.

FIGS. 1 and 2 show the histograms (or PDFs) for CD1 and CD2. As shown in FIGS. 1 and 2, the Anderson-Darling Normality Test failed to prove that the distribution was normal for either CD1 or CD2. Thus, the actual distribution that results from the assessment of the evaluation model is used. The empirical CDFs for the multipliers will be used where the multiplicative factor applied to the break flow model is CD=1+Error. The CDFs corresponding to FIGS. 1 and 2 are shown in FIGS. 3 and 4, respectively.

A similar procedure is developed for other uncertainty attributes (e.g., core heat transfer). The details may be different and can depend on the specific parameter, what is extracted from the data and the simulation results of the corresponding tests generating the data. The general purpose is to obtain the distribution of the correction factor that once applied to the code solution.

In one embodiment, there are more than 40 uncertainty attributes. The number of attributes can depend on the specific application and the specific design of the nuclear reactor.

In an embodiment, the model can miss-predict the data to a moderate extent. For example, the mean error or bias of the model is different when considering the single-phase sub-cooled region as compared to the two-phase saturated region. As previously shown, the bias is relatively small (e.g., −9.2%) in the sub-cooled region and is larger (e.g., −26.8%) in the two-phase saturated region. For the purpose of the uncertainty analysis, these biases are represented individually. The single-phase sub-cooled region predicts the initial blowdown and depressurization during a LOCA until two-phase flow is established in the loop. For smaller breaks, the two-phase discharge is significant during later stages of the LOCA when the venting rate of the steam impacts the energy release from the Reactor Coolant System (RCS) and therefore, the system pressure over a longer period of time. The timing of events such as the loop seal clearance, the depressurization rate during the boil-off period and the accumulator discharge are, for example, impacted by the break flow in the two-phase saturate region. Larger breaks are characterized by a very rapid initial blowdown and very short period of sub-cooled discharge. Fluid upstream of the break reaches saturated conditions very quickly. During most of a large break LOCA transient (until the flow becomes sub-critical) the two-phase critical flow is dominant.

The uncertainty in both input (plant parameters) and the code's physical models are ranged and combined following a random sampling approach. In one embodiment, a Monte Carlo procedure considers the computer code as a black box or transfer function between a random set for the uncertainty parameter X and the figure of merits of the analysis, for example, the peak clad temperature (PCT) and maximum local oxidation (MLO) as shown below.

$$\left\{ \begin{array}{c} PCT \\ MLO \end{array} \right\}_{i=1,\ldots,N} = C(t) \left\{ \begin{array}{c} X_1 \\ X_2 \\ \ldots \\ X_h \end{array} \right\}_{i=1,\ldots,N}$$

wherein N represents the sample size.

An automated process is developed that spins off, for example, several hundred simulations, N, which are executed in parallel on a cluster of processors. The results are analyzed with non-parametric order statistics procedures to obtain the upper tolerance limit of estimated quantities.

Figure 5:
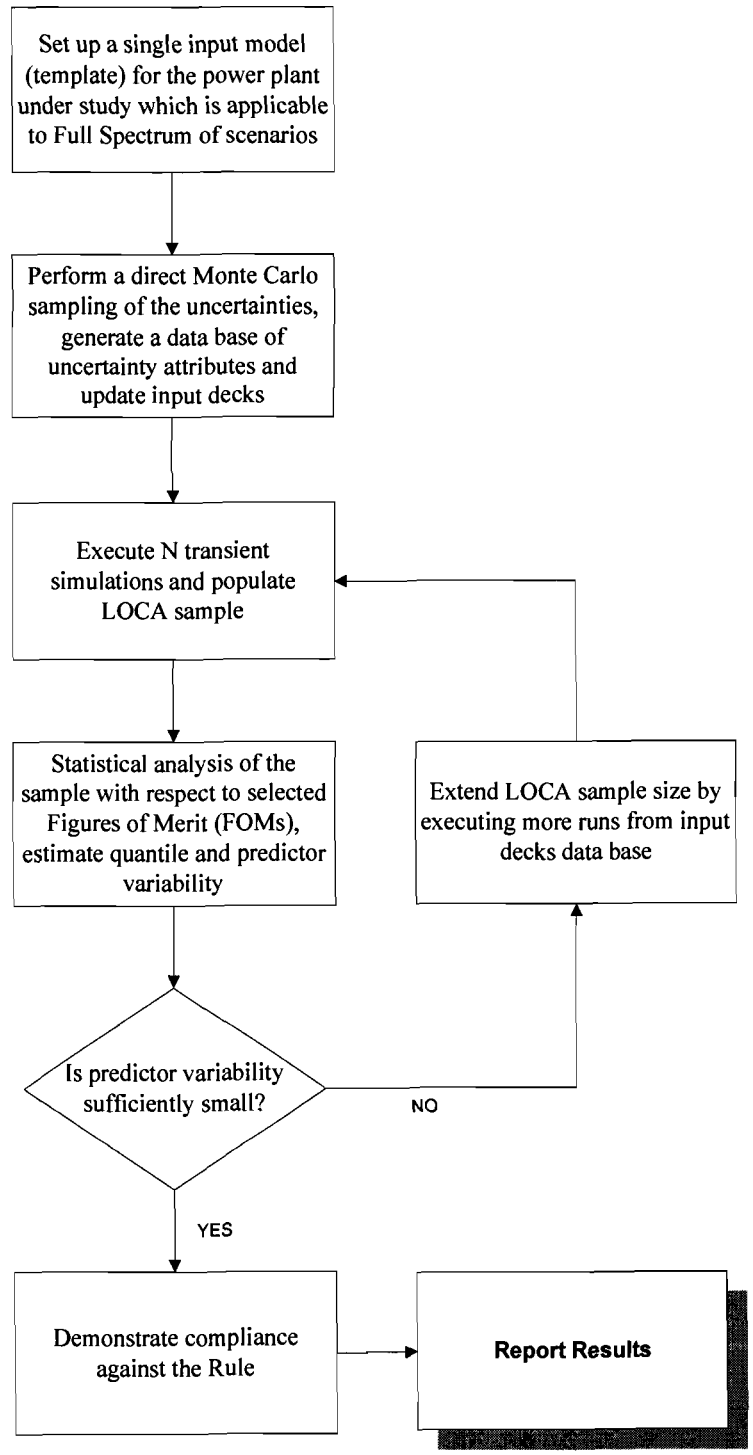
FIG. 5 is a flow chart of a process for modeling and implementing a computational system for analyzing full spectrum postulated LOCAs, in accordance with an embodiment of the present invention.

In one embodiment, a full spectrum LOCA is modeled and analyzed in accordance with the flow chart as shown in FIG. 5.

A single input model (e.g., template) is developed for a light water nuclear power plant to be analyzed. The template contains the input deck which describes the plant-specific geometry and, initial and boundary conditions. This information can be obtained from detailed design drawings, plant-specific design data, and operation parameters. The initial and boundary conditions can include, for example, core design parameters, RCS and ECCS parameters, RCS pressure and temperature, accumulator volume, temperature and pressure, technical specifications and the like. A geometrical model can be rendered using available geometry modeling tools known in the art. The input data that is supplied by the user can be entered using a variety of user-friendly mechanisms known in the art.

The noding or mesh identified for the input model is designed to be applicable to the full spectrum of LOCA scenarios. Nodalization and model options are prescribed in procedures which are developed with the intent of providing consistency between the plant model and the models used to describe the SETs and IETs for the verification and validation (V&V) of the evaluation model. For example, prototypical fuel bundle tests to assess core heat transfer are modeled with the criterion of two hydraulic mesh between two spacer grid. The same criterion is applied for modeling of the assemblies in the reactor core of a PWR.

Most of the values in the template are constant, however, there is a small subset of uncertainty variables. Model and input parameters for which there is an uncertainty are input as variables to be set by an automated process. An input processor generates multiple copies of input decks for downstream execution of multiple sensitivity cases. Input and model uncertainties are randomly sampled following a direct Monte Carlo approach and advanced statistical procedures are utilized to develop an uncertainty statement that satisfies compliance with 10 CFR 50.46 criteria (automated Statistical Treatment of Uncertainty for the Full Spectrum—ASTRUM-FS). The input processor assigns a random value to variables following the Monte Carlo process. A direct Monte Carlo sampling of the uncertainties is performed and a database of uncertainty attributes is generated. The range of uncertainty parameters covers the full spectrum of LOCA scenarios from small break LOCA to large break LOCA. The uncertainty attributes correspond to break size, break type, plant initial and boundary conditions, global modeling, and local uncertainty variables. The input processor extracts the parameters from the uncertainty database, assigns a numerical value to the uncertainty parameters in the input template, calibrates the steady states and launches the execution of transient simulations. Numerous cases ("N"), such as but not limited to, several hundred, are performed in parallel on a cluster of processors. A computer code, such as but not limited to WCOBRA/TRAC-TF2, is used to compute the plant's response to a LOCA event for each of the cases.

Figure 6:
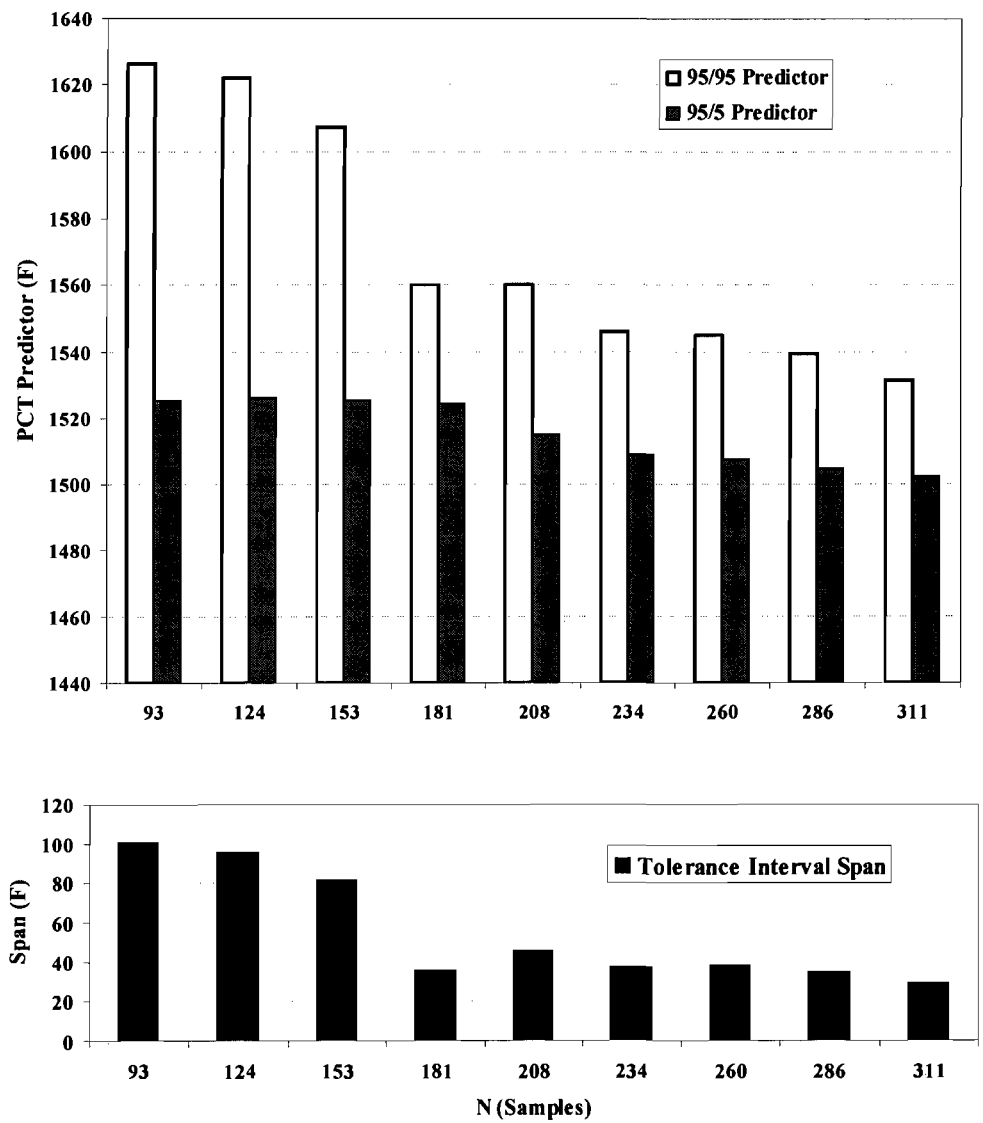
FIG. 6 is a graphical representation of the effect of sample size on the PCT predictor and tolerance interval for Region II, in accordance with an embodiment of the present invention.

As a result, a sample of the LOCA population is obtained. The sample size is extended such that variability in the predictor is minimized to the extent practical. See FIG. 6. The variability of the estimator is estimated by monitoring the confidence interval around a specific quantile of the population.

In one embodiment, the variability of the estimator is estimated by monitoring the confidence interval around the estimated $95^{th}$ quantile of the population, i.e., the difference between the (95/5) and the (95/95). The rank for the order statistics of such estimators is a function of the sample size N as shown in Tables 1 and 2.

As indicated, break size and break type are random variables. The break size spectrum is divided into two regions (Region I and Region II) to achieve a well-balanced coverage (break size spectrum frequency) of all break sizes and types and corresponding scenarios. In known evaluation models, a uniform break area sampling is assumed within each region. However, different and more realistic break area and break type distribution can be considered. For each Regions I and II, the relevant figure of merits are ranked from the highest to the lowest value. In one embodiment, Peak Clad Temperature (PCT) and Maximum Local Oxidation (MLO) are the selected figure of merits. Using a non-parametric statistical procedure, the desired quantile (e.g., the 95th percentile of the PCT and MLO population) is bounded with the desired confidence level (typically at least 95% joint-probability or confidence is required by regulations). For each of Regions I and II, compliance with 10 CFR 50.46 criteria is demonstrated by comparing the upper tolerance limit figures against limits prescribed by the rule.

The subdivision in Regions I and II is suggested for the purpose of obtaining a sample which provides coverage of the break spectrum consistent with current 10 CFR 50.46 rule (as of November 2010). However, a more realistic break area and break type distribution may be considered.

The statistical procedure used above is an extension of the upper tolerance limit procedure discussed by Guba and Makai (Guba, et al., 2003). The derivation is based on the non-parametric multivariate tolerance limits formulation first proved by Wald (1943) and more recently adapted by Guba-Makai (Guba, et al., 2003) to the problem of making safety inferences based on the output of models of complex systems.

Accordingly to Guba-Makai the one sided confidence level using the highest rank as estimator is given by:

$$\beta = 1 - I(\gamma, N - p + 1, p) = \sum_{j=0}^{N-p} \binom{N}{j} \gamma^j (1-\gamma)^{N-j} \quad (1)$$

In one embodiment, two output variables: PCT and MLO are considered. If $\beta=0.95$ and $\gamma=0.95$ are specified, the number of samples N can be calculated as 93. The statistical interpretation of this result is that if we observe a random sample of size N=93, then there is a $\beta=95\%$ probability that the proportion of the population for the two considered output variables (PCT and MLO for the specific application presented herein) having a value below the maximum calculated values among the 93 sampled cases, $\gamma$, is 95%.

The extension considered in ASTRM-FS is the use of lower ranks which tend to be more stable. If instead of the extreme case (rank k=1), a given rank k is chosen as a predictor for the one sided confidence level then:

$$\beta = 1 - I(\gamma, N - p - k + 2, p + k - 1) = \sum_{j=0}^{N-p-k+1} \binom{N}{j} \gamma^j (1-\gamma)^{N-j} \quad (2)$$

This expression is obtained by considering ($r_1 = r_2 = \ldots = r_p = 0$) and $s_p = N - p - k + 2$ in the derivation provided in the paper (Guba et. al. 2003).

If:

$$\binom{N}{j} = \frac{N!}{j!(N-j)!} \quad (3)$$

Then, this can be expanded as follows:

$$\binom{N}{j} = \frac{N(N-1) \ldots (N-j+1)}{j(j-1) \ldots 1} = \prod_{l=1}^{j} \frac{N-l+1}{1} \quad (4)$$

Equation 2 can then be expressed as follows:

$$\beta = 1 - I(\gamma, N - p - k + 2, p + k - 1) \quad (5)$$

$$= (1-\gamma)^N + \sum_{j=0}^{N-p-k+1} \left( \prod_{l=1}^{j} \frac{N-l+1}{1} \gamma^j (1-\gamma)^{N-j} \right)$$

Table 1 lists the different k-th estimator/rank (estimation of the $95^{th}$ quantile) and the corresponding required sample size to achieve the 95% confidence level using Equation 5. By increasing the sample size, N, to infinity, the estimator will be simply k=N/20 (=0.05*N).

As the sample size is increased for a given quantile and confidence level, a lower rank order statistic can be used with the advantage of reducing the predictor variability. A measure of the variance can be extracted by examining for a given sample size the ranks $k_L$ and $k_U$ for the lower and upper tolerance limit respectively for a given quantile. These values can be calculated from Equation 5, and are shown in Table 2 for $\beta=0.95$ and 0.05. The tolerance interval (from <5% to >95%) is a measure of the $Q_{95/95}$ predictor variability. As the sample size increases the tolerance interval is expected to decrease in magnitude.

Whereas particular embodiments of the invention have been described herein for purposes of illustration, it will be evident to those skilled in the art that numerous variations of the details may be made without departing from the invention as set forth in the appended claims.

TABLE 1

Required Sample Sizes for Different k-th Maximum as Estimate of 0.95 Quantile at 95% Confidence Level

| Required Sample Size N | 95/95 Estimator with p = 1 k-th Predictor | 95/95 Estimator with p = 2 k-th Predictor | 95/95 Estimator with p = 3 k-th Predictor |
|---|---|---|---|
| 59 | k = 1 | — | — |
| 93 | k = 2 | k = 1 | — |
| 124 | k = 3 | k = 2 | k = 1 |
| 153 | k = 4 | k = 3 | k = 2 |
| 181 | k = 5 | k = 4 | k = 3 |
| 208 | k = 6 | k = 5 | k = 4 |
| 234 | k = 7 | k = 6 | k = 5 |
| 260 | k = 8 | k = 7 | k = 6 |
| 286 | k = 9 | k = 8 | k = 7 |
| 311 | k = 10 | k = 9 | k = 8 |
| 336 | k = 11 | k = 10 | k = 9 |
| 361 | k = 12 | k = 11 | k = 10 |
| 386 | k = 13 | k = 12 | k = 11 |
| 410 | k = 14 | k = 13 | k = 12 |
| 434 | k = 15 | k = 14 | k = 13 |
| 458 | k = 16 | k = 15 | k = 14 |
| 482 | k = 17 | k = 16 | k = 15 |
| 506 | k = 18 | k = 17 | k = 16 |
| … | … | … | … |
| … | … | … | … |
| … | … | … | … |
| Infinity | k = N/20 | k = N/20 | k = N/20 |

TABLE 2

Ranks $k_L$ and $k_U$ Corresponding to Lower (<5% Tolerance Interval) and Upper (>95% Tolerance Interval) Bounds for Different Sample Sizes for p = 2

| Required Sample Size N | 95/5 Estimator k-th Predictor | 95/95 Estimator k-th Predictor |
|---|---|---|
| 59 | — | — |
| 93 | k = 8 | k = 1 |
| 124 | k = 10 | k = 2 |
| 153 | k = 12 | k = 3 |
| 181 | k = 14 | k = 4 |
| 208 | k = 16 | k = 5 |
| 234 | k = 17 | k = 6 |
| 260 | k = 19 | k = 7 |
| 286 | k = 21 | k = 8 |
| 311 | k = 22 | k = 9 |
| 336 | k = 24 | k = 10 |
| 361 | k = 25 | k = 11 |
| 386 | k = 27 | k = 12 |
| 410 | k = 28 | k = 13 |
| 434 | k = 29 | k = 14 |
| 458 | k = 31 | k = 15 |
| 482 | k = 32 | k = 16 |
| 506 | k = 34 | k = 17 |
| … | … | … |
| … | … | … |
| … | … | … |
| Infinity | k = N/20 | k = N/20 |

We claim:

1. A computational system for performing a safety analysis of a postulated Loss of Coolant Accident in a nuclear reactor for a full spectrum of break sizes including large break, intermediate break and small break, comprising:
   a single input model which includes noding for the full spectrum of break sizes of the postulated Loss of Coolant Accident, said input model includes an input deck which identifies parameters of the nuclear reactor selected from the group consisting of reactor geometry, initial conditions and boundary conditions, and parameters of the postulated Loss of Coolant Accident, said parameters comprising constant parameters and variable parameters;
   an uncertainty database including a random sampling of uncertainty values for specific parameters identifying phenomena expected to occur during the postulated Loss of Coolant Accident, a range of said specific parameters including the full spectrum of break sizes of the postulated Loss of Coolant Accident, such that a random sampling of uncertainty values is identified for the full spectrum of Loss of Coolant Accident break sizes including the large break, intermediate break and small break;
   an input processor to assign uncertainty values for the break size of the postulated Loss of Coolant Accident, to extract the uncertainty values from the uncertainty data base, to generate the input deck including the uncertainty values for the break size, and to execute a Loss of Coolant Accident simulation for the uncertainty values, said Loss of Coolant Accident simulation including a plurality of transient simulations executed in parallel on a cluster of processors, wherein the uncertainty values are ranged and combined following the random sampling and wherein a transfer function C(t) between a random set of values for uncertainty parameter X and a figure of merits according to peak clad temperature (PCT) and maximum local oxidation (MLO) is analyzed using the following formulation:

$$\left\{ \begin{array}{c} PCT \\ MLO \end{array} \right\}_{i=1,\ldots,N} = C(t) \left\{ \begin{array}{c} X_1 \\ X_2 \\ \vdots \\ X_h \end{array} \right\}_{i=1,\ldots,N},$$

where N represents a sample size; and
   a code to compute a response of the nuclear reactor to the Loss of Coolant Accident simulation for the uncertainty values.

2. The computational system of claim 1, wherein the uncertainty data base is generated by obtaining a sampling of uncertainty values.

3. The computational system of claim 2, wherein the sampling of uncertainty values is obtained by a random sampling approach.

4. The computational system of claim 1, wherein the nuclear reactor is a light water reactor.

5. The computational system of claim 1, wherein the uncertainty database is electronically stored.

6. The computational system of claim 1, wherein the specific parameters further comprises break type.

7. The computational system of claim 6, wherein the break type is selected from the group consisting of double-ended guillotine and a split break.

8. A computational method for safety analysis of a postulated Loss of Coolant Accident in a nuclear reactor for a spectrum of break sizes including large break, intermediate break and small break, comprising:
   developing a single evaluation model;
   creating a single input template comprising plant-specific data of the nuclear reactor including constant values and variables, one of the variables being break size of the postulated Loss of Coolant Accident, the break size selected from the spectrum of break sizes including large break, intermediate break and small break;
   entering the input template into the evaluation model;
   employing a random sampling procedure to generate a database for the variables and to assign numerical values to the variables, one of the variables being break size for the postulated Loss of Coolant Accident, the break size selected from the spectrum of break sizes including large break, intermediate break and small break;
   transforming the input template into N input models, wherein N represents a number of variations;
   executing the N input models in parallel on a cluster of processors, the executing includes assigning uncertainty values for the break size, wherein the uncertainty values are ranged and combined following the random sampling procedure and wherein a transfer function C(t) between a random set of values for uncertainty parameter X and a figure of merits according to peak clad temperature (PCT) and maximum local oxidation (MLO) is analyzed using the following formulation:

$$\left\{ \begin{array}{c} PCT \\ MLO \end{array} \right\}_{i=1,\ldots,N} = C(t) \left\{ \begin{array}{c} X_1 \\ X_2 \\ \vdots \\ X_h \end{array} \right\}_{i=1,\ldots,N},$$

where N represents a sample size;
   obtaining results for each of the N input models;
   post-processing the results; and
   obtaining statistical merits to demonstrate compliance with design acceptance criteria.

9. A computational method for safety analysis of a postulated Loss of Coolant Accident in a nuclear reactor for a spectrum of break sizes including large break, intermediate break and small break and break types, comprising:
   developing a single evaluation model for the spectrum of break sizes including large break, intermediate break and small break;
   creating a single input template to load into the evaluation model, the input template comprising plant-specific data of the nuclear reactor including constant values and uncertainty values, two of the uncertainty values being break size and break type of the postulated Loss of Coolant Accident, the break size selected from the spectrum of break sizes including large break, intermediate break and small break, and the break type selected from double-ended guillotine and split break;
   employing a random sampling approach to generate model parameters, to assign numerical values to the uncertainty values and to generate a database of uncertainty values, the uncertainty values encompassing the spectrum of break sizes and break type for the postulated Loss of Coolant Accident;
   generating variations of the input template to represent different values for the uncertainty values;

executing a plurality of transient simulations to encompass the spectrum of break sizes and break type for the postulated Loss of Coolant Accident, the executing includes assigning uncertainty values for the break size, wherein the uncertainty values are ranged and combined following the random sampling approach and wherein a transfer function C(t) between a random set of values for uncertainty parameter X and a figure of merits according to peak clad temperature (PCT) and maximum local oxidation (MLO) is analyzed using the following formulation:

$$\left\{ \begin{matrix} PCT \\ MLO \end{matrix} \right\}_{i=1,\ldots,N} = C(t) \left\{ \begin{matrix} X_1 \\ X_2 \\ \vdots \\ X_h \end{matrix} \right\}_{i=1,\ldots,N},$$

where N represents a sample size;
computing a response of the nuclear reactor for the spectrum of break sizes and break type for the postulated Loss of Coolant Accident for the postulated Loss of Coolant Accident; and post-processing the results to obtain statistical figure of merits to demonstrate compliance with design acceptance criteria.

* * * * *